June 16, 1964 C. PRESS ETAL 3,137,368
DISC BRAKE
Filed Oct. 24, 1962 3 Sheets-Sheet 1

CARL PRESS
& ERNST MEIER
INVENTORS

BY
Stevens, Davis, Miller & Mosher
ATTORNEYS

June 16, 1964  C. PRESS ETAL  3,137,368
DISC BRAKE

Filed Oct. 24, 1962  3 Sheets-Sheet 3

CARL PRESS
& ERNST MEIER
INVENTORS

BY
Stevens, Davis, Miller & Mosher
ATTORNEYS

United States Patent Office 3,137,368
Patented June 16, 1964

3,137,368
DISC BRAKE
Carl Press, Frankfurt am Main, Bonames, and Ernst Meier, Frankfurt am Main, Sindlingen, Germany, assignors to Alfred Teves KG, Frankfurt am Main, Germany, a limited-liability company of Germany
Filed Oct. 24, 1962, Ser. No. 232,823
Claims priority, application Germany Oct. 24, 1961
4 Claims. (Cl. 188—73)

This invention relates to new and useful improvements in disc brakes, and particularly to novel partial lined disc brakes hydraulically and manually actuated.

The invention provides a disc brake comprising a brake frame embracing a rotatable disc and having side walls by which the brake shoes are guided and supported, clamping arms linked to the brake frame and acting on said brake shoes, and a two-armed brake lever the fulcrum of which is connected to the free end of the one clamping arm or a tie rod extending above the rim of the disc. The short end of the brake lever is linked to the free end of the other clamping arm. The long end of the brake lever is connected by means of a piston rod to a hydraulic piston delivering the braking force.

According to the invention, the hydraulic cylinder exerting force on the long end of the brake lever is attached to the brake frame in such a manner that the force which actuates the brake lever extends diagonal through the brake frame with respect to the disc plane. According to an embodiment of the invention, the hydraulic cylinder is fixedly secured to the brake frame. According to another embodiment of the invention, the hydraulic cylinder is rigidly secured to the clamping arm. Still another embodiment provides the hydraulic cylinder secured to the clamping arm by means of a common pivot. It should be understood that the axis of hydraulic cylinder is preferably arranged so as to intersect the pivot axis of the clamping arm.

The primary object of this invention is to resolve the braking force of the hydraulic piston, which braking force acts against one of the side walls of the brake frame in such a manner that but one force component is directed normal to that of the disc.

A further object of this invention is to provide an arrangement, wherein the brake frame is subject to a smaller or, respectively, a more favorably directed stressing force than a brake frame being subjected to braking forces which are directed normal to that of the brake disc.

A still further object of this invention is to provide a brake frame having smaller dimensions and substantially reduced cross-sectional areas.

With the above and other objects in view that will hereinafter appear, the nature of the invention will be more clearly understood by reference to the following detailed description, the appended claims and the accompanying drawing, in which:

FIGURE 1 of the drawing is a sectional view taken through the disc brake and shows a first embodiment thereof;

Figure 1:
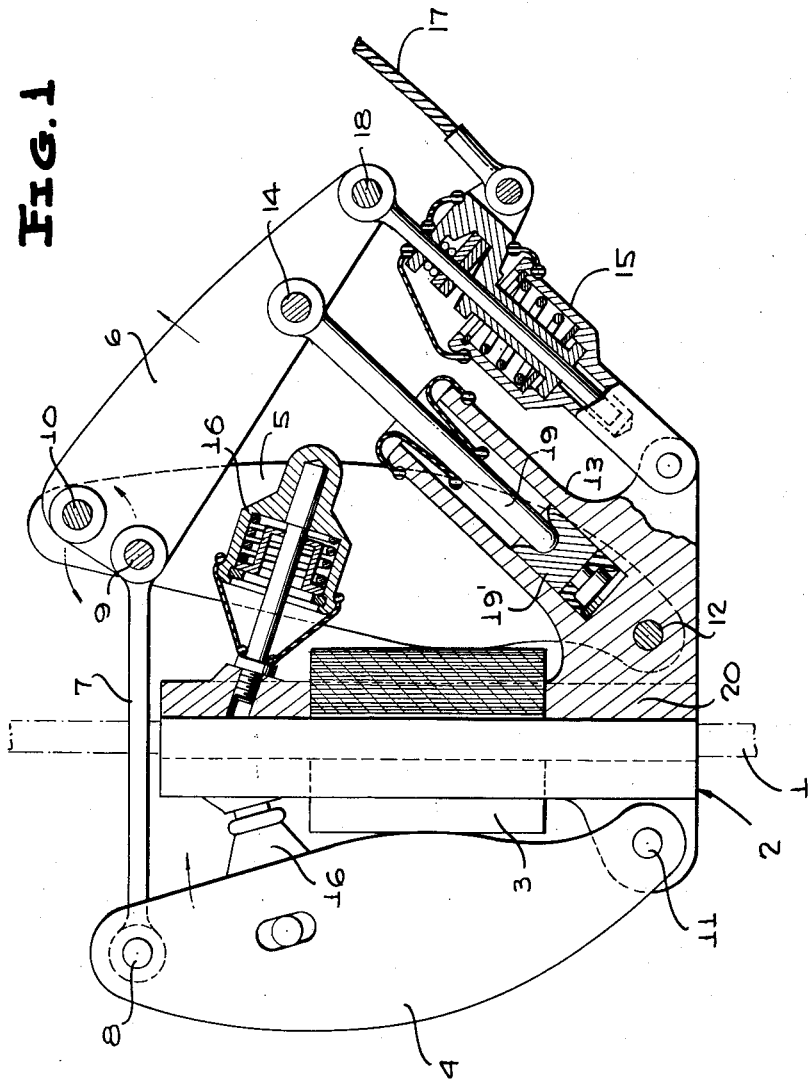

Referring to FIGURE 1, there is shown a brake disc 1 which is rigidly connected to a shaft not shown. A U-shaped brake frame 2 embraces the disc 1 on both sides, the frame 2 guiding the two brake shoes 3. A first clamping arm 4 is linked to a suitably projecting flange of the frame 2 by means of a pivot 11, and, symmetrically therewith, a second clamping arm 5 is connected to the other side of the frame 2 by means of a pivot 12.

A brake lever 6 is pivotally joined to a tie rod 7 by a pivot shaft 9 defining a fulcrum of the brake lever 6. The other end of the tie rod 7 is pivotally connected to the free end of the clamping arm 4 by a pivot shaft 8. The brake lever 6 includes two portions, a short and a long portion, extending from the fulcrum point 9. The short portion is defined as the distance between the fulcrum point 9 and the pivot point 10 by which the brake lever 6 is pivotally mounted on the free end of the clamping arm 5. The long portion of the brake lever 6 is defined as the distance between the fulcrum point 9 and the pivot shaft 14.

A hydraulic cylinder 13 is either rigidly attached to the brake frame 2 or is an integral part thereof. The center axis of the cylinder extends diagonal with respect to the brake disc 1, and approximately, normal to the brake lever 6. A piston rod 19 is connected with its one end to a piston 19' and with its other end to the long portion of the brake lever 6 by means of a pivot shaft 14. Suitable means (not shown) are provided for applying and relieving fluid pressure to the piston 19' in the cylinder 13 in order to actuate the brake.

The adjusting devices 16, one for each clamping arm or, respectively, for each brake shoe, are not described in detail since they are not subject matter of this invention and act in a known manner. Likewise, the adjusting device 15, which is pivotally inserted between the brake frame 2 and the brake lever 6 is not of further interest. However, it should be understood that a manual operation of the brake acts on the brake lever 6 via a cable 17 and the adjusting device 15 having a pivot point 18 connected to the brake lever 6.

Briefly, the operation of the disc brake is as follows: Upon applying fluid pressure to the cylinder 13, the piston 19' and piston rod 19 move outwardly, thereby turning the brake lever 6 counter clockwise. Therefore, the pivot point 10 moves, in a circular path, to the left, thus forcing the clamping arm 5, which is pivotally mounted on the frame 2, to press the brake shoe 3 against the disc 1, whereas, simultaneously, the pivot point 9, and the pivot point 8 via the tie rod 7, moves to the right, thus forcing the clamping arm, which is pivotally secured to the frame 2, to press the other brake shoe 3 against the disc 1.

As can be clearly seen, the braking force which acts via the piston rod 19 upon the brake lever 6 is resolved in two components: a horizontal component which is smaller and is directed normal to the plane of the brake disc 1, and a vertical component which is larger and extends parallel to the disc 1, thus achieving the object of this invention. The horizontal component acts on the disc by way of the brake shoes; whereas the vertical component acts on the side wall 20 of the brake frame 2.

Figure 2:
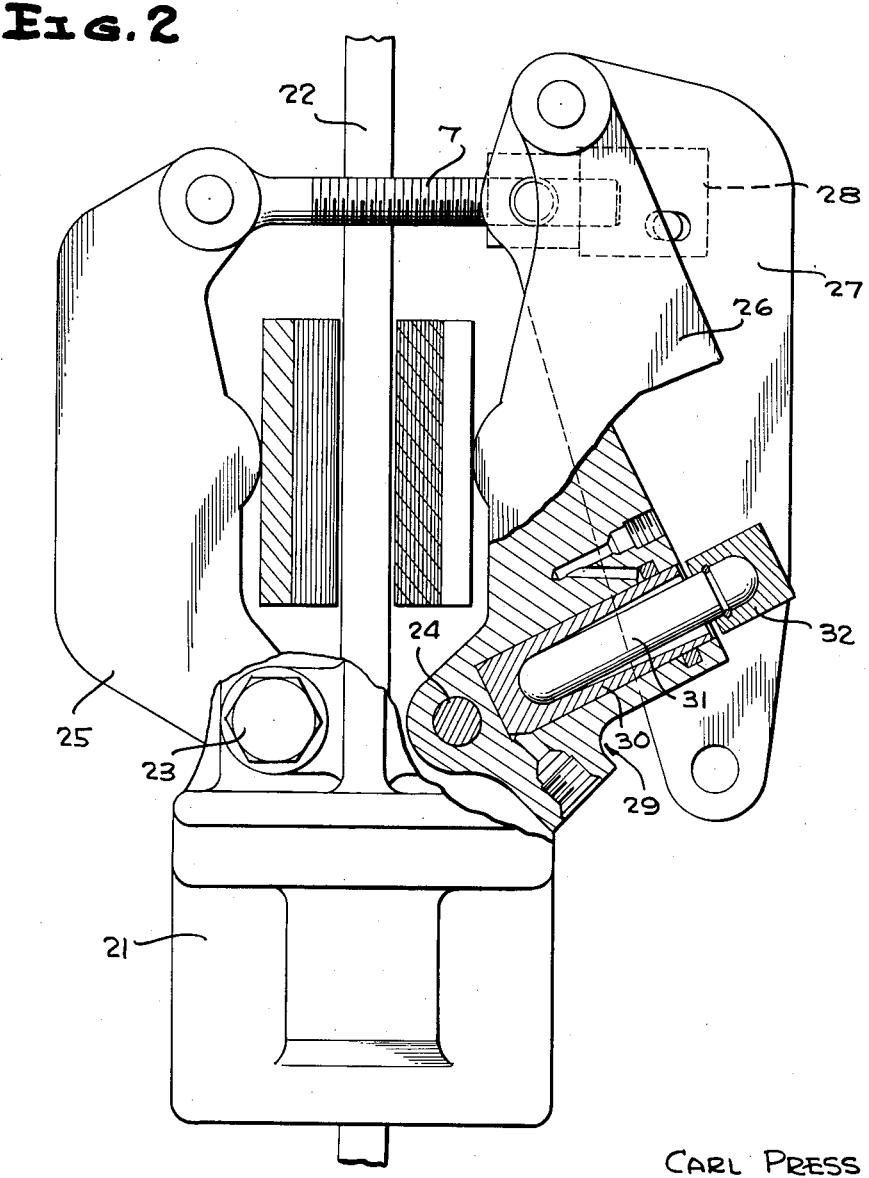
FIGURE 2 is a view similar to FIGURE 1 of a second embodiment.

FIGURE 2 shows another embodiment of the invention, wherein a brake disc 22 is embraced by a U-shaped brake frame 21, to which the clamping arms 25 and 26 are pivotally linked at the points 23 and 24, respectively. The clamping arm 25 is connected to a brake lever 27 by a tie rod 7 extending above the edge of the disc 22, the tie rod 7 being part of an adjusting device 28 the performance of which is known in the art. The clamping arm 26 is pivotally joined to the brake lever 27 in the same manner as indicated in FIGURE 1.

According to the feature of this embodiment, the hydraulic cylinder 29 is formed as an integral part of the clamping arm 26. The piston 30 acts via a push rod 31 on a counter piece 32 which is pivotally secured to the brake lever 27. It is to be noted that the arrangement of this embodiment needs very little space.

Figure 3:
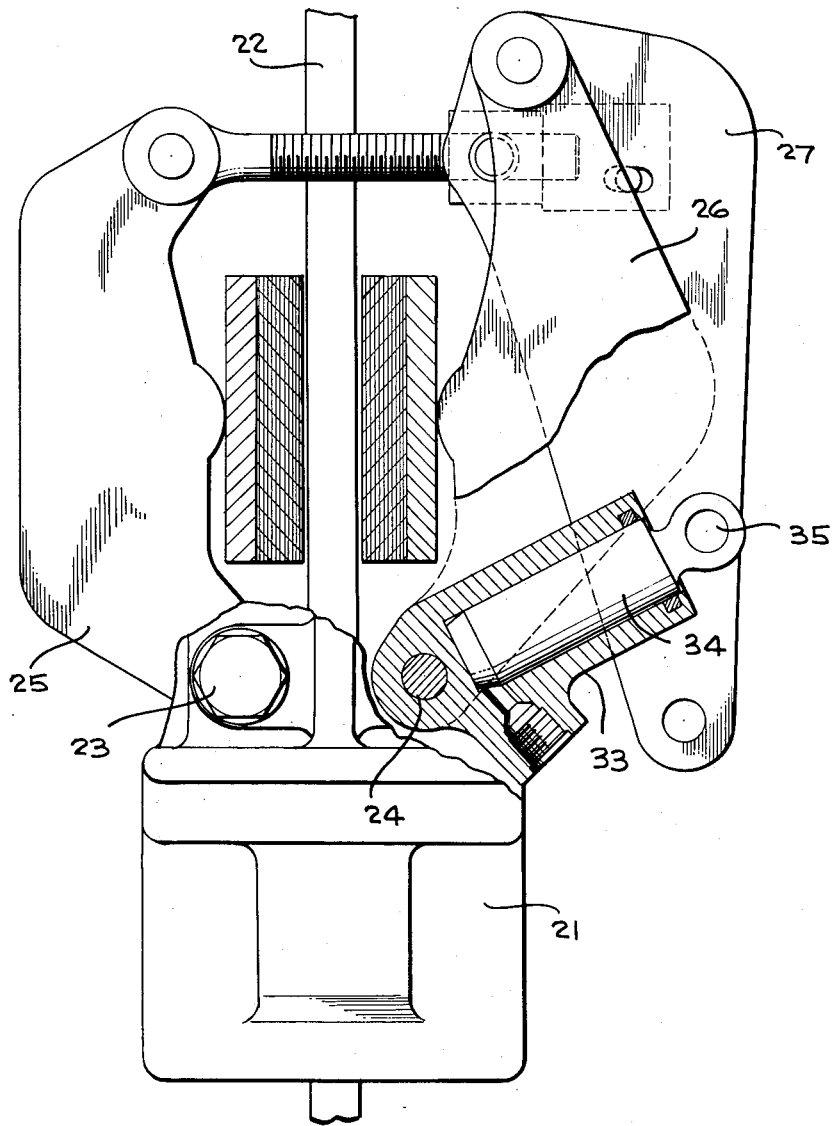
FIGURE 3 is a view similar to FIGURE 1 of a third embodiment.

FIGURE 3 is a preferred embodiment of the arrangement of FIGURE 2. As already shown in FIGURE 2, a brake disc 22 is embraced by a U-shaped brake frame 21, to which the clamping arms 25 and 26 are pivotally linked at the points 23 and 24, respectively. The connections of the brake lever 27 to the clamping arms 25 and 26 correspond to that shown in FIGURE 2.

In accordance with the FIGURE 3 embodiment, the hydraulic cylinder 33 is pivotally linked to the point 24 which is also the fulcrum for the clamping arm 26. A piston 34 acts via a pivot shaft 35 on the brake lever 27.

The clamping arm 26 and the brake lever 27 are so designed that the brake lever 27 and the hydraulic cylinder 33, are nested within a slot provided in clamping arm 26, thus the cylinder 33 is independently mounted on the clamping arm 26 and can be arranged in any diagonal direction with respect to the disc 22 without interfering with the operation of clamping arm 26.

Although various embodiments of the invention have been illustrated and described, it is to be understood that minor variations may be made within the spirit and scope of the invention, as defined in the appended claims.

What is claimed is:

1. A both hydraulically and manually operable disc type brake comprising a U-shaped brake frame including sidewalls embracing a brake disc, brake pads guided and supported by said side walls, a first and a second clamping arm linked to said brake frame by pivot shafts for acting on said brake pads, a brake lever including a short end, a long end and a fulcrum point, said fulcrum point connected to said first clamping arm by a tie rod extending above the edge of said brake disc, said short end connected to said second clamping arm, and a hydraulic brake actuating device including a cylinder and a piston, said device connected to said long end of said brake lever, and the center line of said device substantially intersecting the main axis of said pivot shaft linking said second clamping arm to said brake frame.

2. The disc type brake of claim 1 wherein said hydraulic cylinder is fixedly secured to said brake frame.

3. The disc type brake of claim 1 wherein said hydraulic cylinder is fixedly secured to said second clamping arm.

4. The disc type brake of claim 1 wherein said hydraulic cylinder and said second clamping arm are linked to said brake frame by means of a common pivot shaft.

References Cited in the file of this patent

UNITED STATES PATENTS

| | | |
|---|---|---|
| 2,815,092 | Baselt | Dec. 3, 1957 |
| 2,830,679 | Butler | Apr. 15, 1958 |
| 2,907,412 | Butler | Oct. 6, 1959 |

FOREIGN PATENTS

| | | |
|---|---|---|
| 1,245,350 | France | Sept. 26, 1960 |